(12) United States Patent  (10) Patent No.: US 8,272,573 B2
Hartel  (45) Date of Patent: Sep. 25, 2012

(54) PORTABLE DATA CARRIER

(75) Inventor: Karl Eglof Hartel, München (DE)

(73) Assignee: Giesecke & Devrient GmbH, Munich (DE)

( * ) Notice: Subject to any disclaimer, the term of this patent is extended or adjusted under 35 U.S.C. 154(b) by 520 days.

(21) Appl. No.: 12/514,914

(22) PCT Filed: Nov. 15, 2007

(86) PCT No.: PCT/EP2007/009894
§ 371 (c)(1),
(2), (4) Date: Jan. 20, 2010

(87) PCT Pub. No.: WO2008/058743
PCT Pub. Date: May 22, 2008

(65) Prior Publication Data
US 2010/0108772 A1 May 6, 2010

(30) Foreign Application Priority Data
Nov. 15, 2006 (DE) .......................... 10 2006 053 789

(51) Int. Cl.
G06K 19/06 (2006.01)
(52) U.S. Cl. ......... 235/492; 235/487; 235/441; 710/301
(58) Field of Classification Search .................. 235/492, 235/487, 441; 710/301
See application file for complete search history.

(56) References Cited

U.S. PATENT DOCUMENTS

| 6,151,647 | A * | 11/2000 | Sarat ............................ 710/301 |
| 6,840,454 | B1 | 1/2005 | Rhelimi |
| 2005/0224588 | A1 | 10/2005 | Ruping |
| 2007/0158439 | A1 * | 7/2007 | Conner et al. ................ 235/492 |

FOREIGN PATENT DOCUMENTS

| DE | 19515713 A1 | 10/1996 |
| DE | 19523275 C1 | 12/1996 |
| EP | 1837796 A1 | 9/2007 |
| GB | 2345781 A | 7/2000 |
| WO | 9942952 A1 | 8/1999 |
| WO | 9949415 A2 | 9/1999 |
| WO | 2005066888 A1 | 7/2005 |
| WO | 2005124656 A1 | 12/2005 |

OTHER PUBLICATIONS

Search Report of German Patent and Trademark Office regarding German Patent Application No. 10 2006 053 789.0, Jan. 17, 2007.
International Search Report in PCT/EP2007/009894, Mar. 6, 2008.

* cited by examiner

Primary Examiner — Allyson Trail
(74) Attorney, Agent, or Firm — Bacon & Thomas, PLLC

(57) ABSTRACT

A portable data carrier (1) comprising a contact pad (2) according to ISO 7816-2 as a physical interface for communication has a contactless interface device (7) for communication with an end device according to a contactless communication protocol via a preset activated contact assignment of the contact pad (2), and at least one contact interface device (4, 5, 6) for communication according to a contact-type communication protocol via a further activated contact assignment of the contact pad (2). In an initialization phase of the data carrier (1) a control device (3) activates a second contact interface device (4, 5, 6), besides an already activated contact interface device (4, 5, 6), only when the former does not use a contact assignment of the contact pad (2) that collides with the contact assignment of the contactless interface device (7). The contactless interface device (7) is activated as a second interface device if the preset contact assignment of the contactless communication protocol does not collide with the contact assignment of the already activated contact interface device (4, 5, 6).

33 Claims, 2 Drawing Sheets

Figure 3:
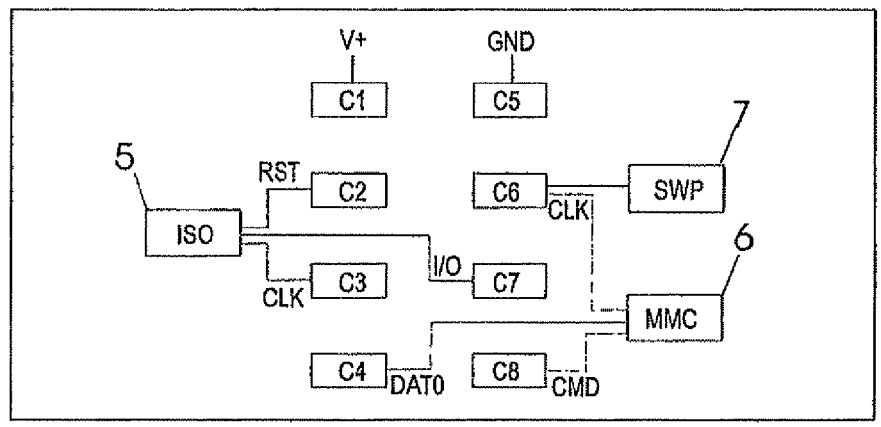

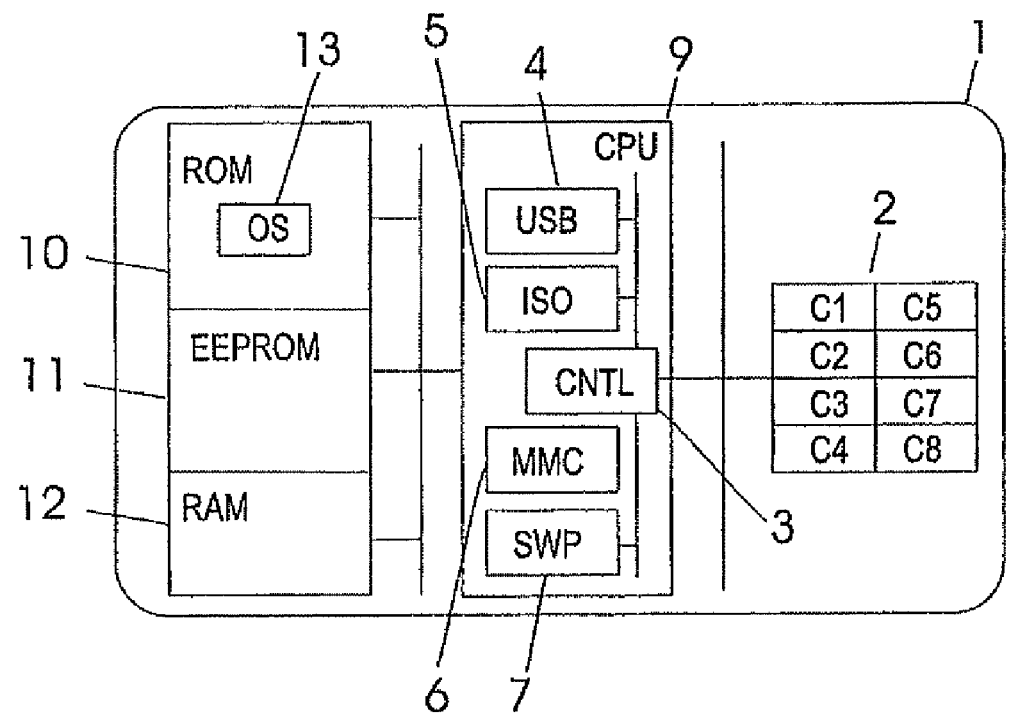
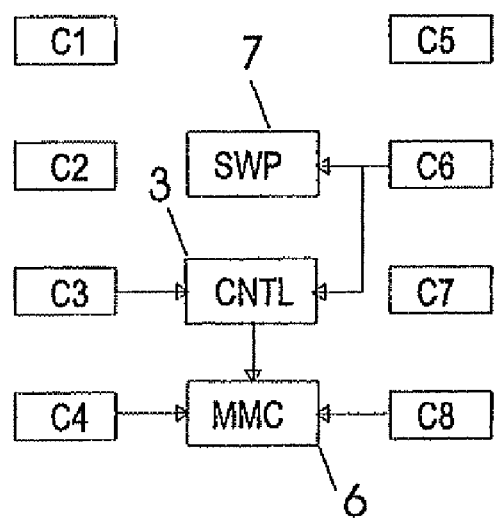

PORTABLE DATA CARRIER

The present invention relates to a method for activating contact assignments of a contact pad of a portable data carrier and to such a portable data carrier.

Nowadays, diverse portable data carriers are used which a user can carry in order to utilize different services or carry out transactions. For example, chip cards or mobile communication cards are used to obtain access, by a corresponding authentication, to secure areas or services, e.g. the applications of a mobile communication provider that are provided over a mobile communication network. Depending on the type, and manner of use, of such a data carrier, the communication between the data carrier and an end device in contact therewith, for example a telecommunication end device or bank terminal, is carried out via a suitable communication protocol. The data carrier is connected to the end device here via the physical interface of a contact pad of the data carrier. For each communication protocol used there is specified an individual contact assignment of the contact pad whose contacts are not simultaneously available for other purposes, e.g. for a further communication protocol.

Because the number of contact points of such a contact pad and thus the possible different contact assignments are limited, there is also a limited possibility of carrying out a parallel communication via a plurality of communication protocols simultaneously, since overlaps and thus collisions can arise on account of the normally defined contact assignments. Via a contact pad, used in the chip card area, according to the ISO 7816-2 standard with eight contact points C1 to C8, different communication protocols are used for a contact-type communication (referred to hereinafter as "contact-type communication protocols"), for example the MMC high-speed protocol ("multimedia card"), which uses the contacts C4, C6 and C8, or the USB high-speed protocol ("universal serial bus"), which uses the contacts C4 and C8 (cf. documents SCPt060551 and SCPt060552 of the European Telecommunications Standards Institute, ETSI).

Furthermore, a support of communication protocols for a contactless communication (referred to hereinafter as "contactless communication protocols") is also desirable to permit communication simultaneously also via a radio link in parallel with the use of contact-type communication protocols. Such contact-type communication protocols in turn occupy additional or overlapping contact assignments of the contact pad. However, it is possible that a technically possible contactless communication cannot be carried out because at least some contacts of the associated contact assignment are blocked by an already activated contact-type communication. In this connection, WO 2005/124656 A1 discloses a possibility of operating a contact-type high-speed protocol and a contactless communication protocol with colliding contact assignments. For this purpose, the communication protocols present at the data carrier are recognized, and activated or deactivated according to certain priority settings. A similar control for an optionally also parallel operation with different communication protocols is shown by WO 2005/066888 A1.

Therefore, it is the object of the present invention to permit a simultaneous communication via different communication protocols with a contact pad of a portable data carrier in a flexible manner.

This object is achieved according to the invention by a method and data carrier having the features of the independent claims. The claims dependent thereon describe advantageous embodiments and developments of the invention.

It is a basic idea of the present invention to reserve at least one contact as yet unassigned, with a first contact assignment activated, when different contact assignments for the as yet unassigned contacts are possible.

The reservation can be permanently preset in order to consider known boundary conditions. Alternatively, the reservation can be temporarily effected and/or suspended, for example in response to received, corresponding commands (RESERVE and UNRESERVE), on the basis of conditions preset in the data carrier, or under the control of an application on the portable data carrier. A reservation can thus be triggered in situational fashion.

An inventive portable data carrier (with a contact pad according to ISO 7816-2) comprises an interface device which supports a communication with an end device according to a contactless communication protocol via a preset contact assignment of the contact pad (referred to hereinafter as a "contactless interface device"), and at least one further interface device which supports a communication with an end device according to a contact-type communication protocol via varying contact assignments of the contact pad (referred to hereinafter as a "contact interface device"). The contact assignment to be activated for communication via the contactless communication protocol (referred to hereinafter as the "contactless contact assignment") can overlap with at least one of the contact assignments for the particular contact-type communication protocols supported by the data carrier (referred to hereinafter as the "contact-type contact assignment"). In this case, at least one contact is used by the contactless communication protocol and by at least one contact-type communication protocol, so that the corresponding contact assignments collide with regard to said contact.

A control device of the data carrier is able to permit a (quasi) parallel communication via two different communication protocols whose contact assignments do not collide by the corresponding interface devices or contact assignments being active in at least temporarily overlapping fashion, or even being activated simultaneously, when the particular communication protocols are present at the contact pad. The term "contact assignment of a communication protocol" is to be understood here to be that individual group of contacts of the contact pad that is accessed by an end device upon communication with the data carrier via the communication protocol. "Activation of a contact assignment" is thus understood to be an activation of that interface device of the data carrier that accesses contacts of the contact pad that constitute the contact assignment belonging to the communication protocol supported by the interface device.

When a second communication protocol is present at the contact pad during a communication between the data carrier and an end device or terminal via a first contact-type communication protocol by means of an activated first contact interface device, the control device activates the corresponding second interface device, provided there is no collision between the contact assignment of the first contact interface device or first contact-type communication protocol and that of the second interface device or second communication protocol.

However, in the event that the second communication protocol is a contact-type protocol and the corresponding second interface device is therefore a contact interface device, the control device checks whether the activation thereof would result in a contactless interface device no longer being activatable on account of a collision of the corresponding contact assignments. A second contact interface device is therefore only activated when even after the activation thereof a contact assignment for a contactless communication protocol still remains free and can be used for communication by the corresponding contactless interface device. The contactless interface device is thus de facto granted a priority or preference over a second contact interface device. This ensures that a communication via a contactless communication protocol is not prevented by a plurality of contact-type communications using a multiplicity of contact assignments. A contactless communication of the data carrier is thus only excluded when the contact-type contact assignment of the first contact interface device already collides with the contact assignment of a contactless communication protocol. This ensures the availability of a data carrier for contactless communication.

If the second interface device is a contactless interface device, the above-mentioned check is unnecessary. Then a collision of the first contact-type contact assignment and the contactless contact assignment is instead checked by the control device of the data carrier. The control device recognizes a contact assignment of a contact-type communication protocol present at the contact pad and activates the contactless interface device and the preset contact assignment thereof only when the contact-type contact assignment of the first contact interface device does not collide with the preset contactless contact assignment, i.e. when there are no overlaps of the two contact assignments to be activated.

The above-described process is preferably carried out upon switch-on of the portable data carrier, i.e. during its initialization or boot-up sequence upon which communication links present at the contact pad are checked. The relevant interface devices are then activated preferably sequentially by the control device, in accordance with the results of the above-described collision checks. The collision checks are carried out by monitoring a voltage applied to individual contacts of the contact pad by the end device and deriving therefrom a contact assignment of a communication protocol which is used by the relevant interface device. Besides recognizing the contact assignment of a contact-type communication protocol, the control device can also check the contact assignment of a contactless communication protocol and recognize it by a voltage supply of certain contacts. Thus, for example the contactless SWP communication protocol ("single wire protocol") to be used for near field communication can be recognized by a voltage modulation at the C6 contact of the contact pad according to ISO 7816-2, because an SWP signal is pulse-width modulated, in contrast to the clock signals of contact-type communication protocols. After the control device has recognized e.g. a contact-type and a contactless communication protocol, the contact assignments of both communication protocols are activated in case of collision-free contact assignments, so that corresponding contactless and contact interface devices can simultaneously carry out contactless and contact-type communications via the corresponding communication protocols.

If a contact-type communication link according to the MMC communication protocol ("multimedia card") is applied to the contact pad of the data carrier by an end device, the control device recognizes the MMC communication protocol by a high voltage level at the C4 contact and/or the C8 contact of the contact pad which is applied in the initialization phase of the MMC communication protocol. Alternatively or additionally, the MMC communication protocol can also be recognized by a certain MMC initialization signal, e.g. the CMD1 signal according to the specification MMC 4.1 of the MMC communication protocol, incoming via the C4 contact and/or the C8 contact. If a clock signal of the MMC communication protocol is furthermore recognized at the C6 contact of the contact pad in the case of an MMC interface device to be activated as a first contact interface device, the control device activates the MMC interface device with the usual contact assignment of the MMC communication protocol which uses the contacts C4 and C8 as well as the contact C6 for the clock signal of the MMC protocol. A contactless interface device for a contactless communication protocol whose contact assignment uses the contact C6, for example the SWP communication protocol, is then deactivated or not activated by the control device, because otherwise a collision would occur with regard to the C6 contact. If the control device recognizes the clock signal of the MMC protocol at the contact C3, however, a contactless interface device for a contactless communication protocol can also be activated via the contact C6, for example the SWP communication protocol, simultaneously with the MMC interface device which taps the MMC clock signal at the C3 contact.

If after the switch-on of the data carrier the control device recognizes a contact-type ISO communication protocol present at the contact pad whose contact assignment comprises the contacts C2, C3 and C7, an ISO interface device can be activated as a first contact interface device and for example the SWP interface device with the contact C6 as the contactless interface device. The control device recognizes the ISO communication protocol for example by a clock signal being present at the contact C3 and a voltage level present at the contact C2 being changed from "low" to "high" or 0 to 1 during a normal initialization sequence of the ISO interface device. The control device then activates the contacts C2, C3 and C7 for the ISO communication protocol.

Beside the ISO interface device as a first activated contact interface device (via the contacts C2, C3, C7), the basically possible activation of an MMC interface device as a second interface device for a simultaneous communication via the MMC communication protocol (via C4, C6, C8) is excluded, however, on account of the preference of the contactless SWP interface device. The MMC interface device is therefore deactivated by the control device after the activation of the ISO interface device, so that a contactless communication via the contact C6 in any case remains possible in parallel with the communication via the ISO communication protocol. The deactivation of the MMC interface device results from the consideration that the contact C3 is already required for the clock signal of the ISO communication protocol, so that the clock signal of the MMC protocol can be present free of collision only at the contact C6 which, however, is to be kept for a contactless communication.

By an accordingly low or zero voltage present at the C6 contact and/or the C8 contact, the control device recognizes that either no contact-type communication protocol or the contact-type USB high-speed protocol is present. A present communication link according to the USB protocol can alternatively also be recognized by the control device by of a USB initialization signal, e.g. according to the specification USB 1.0 of the USB protocol, incoming via the contact C4 and/or the contact C8. The corresponding USB interface device can thus be activated both as a first and as a second contact interface device without thereby blocking a contactless communication by the SWP interface device, because the USB contact assignment comprises the contacts C4 and C8, and thus the activation of the MMC interface device blocking the contact C6 of the SWP interface device and likewise using C4 and C8 is basically excluded. Thus, for example, a (quasi) parallel contact-type communication according to the ISO protocol (C2, C3, C7), according to the USB protocol (C4, C8) and a contactless communication according to the SWP protocol (C6) are possible.

The present invention thus permits the contactless SWP protocol via the C6 contact to be operated simultaneously with at least one contact-type communication protocol, e.g. with the MMC protocol (via C3 for the clock signal and C4, C8), with the ISO protocol (via C2, C3, C8) or with the USB protocol (via C4, C8). If a contact-type communication via the ISO protocol and a contactless communication via the SWP protocol are already being carried out via the contact pad of the portable data carrier, the USB protocol can theoretically also be activated in addition, but not the MMC protocol. Furthermore, the SD communication protocol for contact-type communication based on the MMC standard is also integrable into the present invention.

Besides contactless near field communication via the SWP protocol, other radio communications can also be integrated into the present invention, e.g. communication protocols for RFID ("radio frequency identification"), Bluetooth, WiFi ("wireless fidelity") and the like, which can again use individual contact assignments of the contact pad according to ISO 7816-2. Furthermore, it is basically possible to apply the present invention to any mulitple-pad contact pads as contact interfaces between communication devices in order to operate a contactless communication protocol in parallel with contact-type communication protocols while avoiding collisions. The invention is mainly suitable, however, for use in a portable data carrier with a contact pad according to ISO 7816-2 for realizing the contactless SWP protocol besides other common contact-type communication protocols. Portable data carriers to be used here are in particular chip cards, mobile communication cards, secure mass storage cards, USB tokens and the like, which can also be designated as portable security modules.

Figure 4:
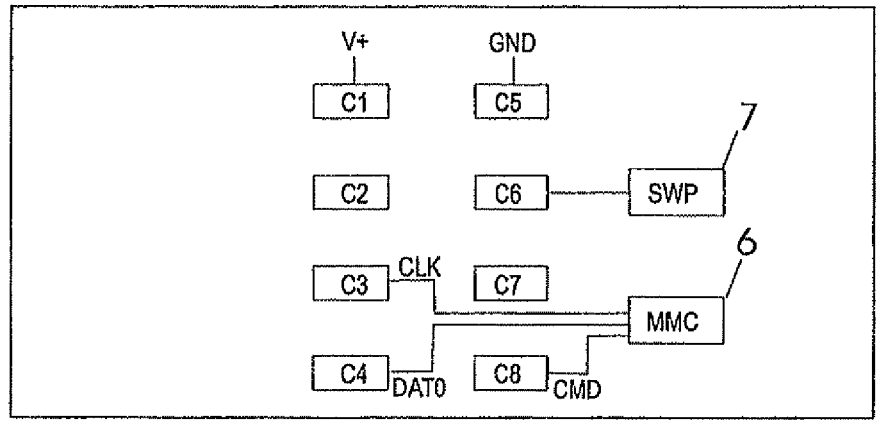
Figure 5:
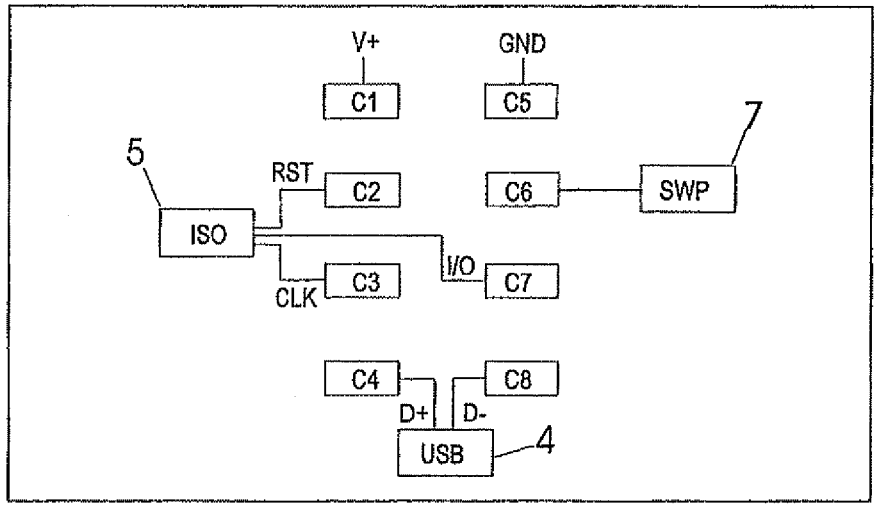

Further features and advantages of the invention will emerge from the following description of various inventive embodiments as well as further alternative embodiments in conjunction with the accompanying drawings. Therein is shown:

FIG. 1 a chip card with an inventive control device;

FIG. 2 a schematic representation of a simultaneous activation of the MMC and SWP communication protocols;

FIG. 3 contact assignments upon simultaneous activation of an ISO and a SWP communication protocol;

FIG. 4 contact assignments upon simultaneous activation of an MMC and an SWP communication protocol; and FIG. 5 contact assignments upon simultaneous activation of an ISO, a USB and an SWP communication protocol.

The eight-pad contact pad according to ISO 7816-2 is intended in particular for providing physical interfaces for different communication protocols via individual contact assignments in chip cards, smart cards, mobile communication cards and the like. A chip card 1 with such a contact pad 2 is shown in FIG. 1. The contact pad according to ISO 7816-2 comprises eight contacts C1 to C8, the contact C1 being intended for a supply voltage (V+) of the chip card and the contact C5 as ground (GND). Depending on the particular communication protocol which specifies in an initialization or start phase of the chip card 1 an end device in contact with the chip card 1, for example a mobile phone, bank terminal or other stationary or portable electronic communication apparatus, there are used certain contact assignments for the particular communication protocols. The communication is then carried out by a corresponding interface device 4-7 via activated contact assignments. In view of the multiplicity of communication protocols that are nowadays used or desirable, the contact pad according to ISO 7816 does not possess enough individual contacts to permit simultaneous operation of any desired communication protocols.

The chip card 1 furthermore comprises a processor 9 (CPU) which executes an operating system 13 (OS) of the chip card 1 and further applications, e.g. the interface devices 4-7, as well as a memory assembly, comprising a permanent ROM memory 10, a non-volatile EEPROM memory 11 and a volatile RAM working memory 12.

A common communication protocol for communication via a contact pad according to ISO 7816-2 is the contact-type ISO communication protocol provided by an ISO interface device 5 and whose contact assignment comprises the contacts C2, C3 and C7 (cf. FIGS. 3 and 5). Furthermore, there is increasing use of the contact-type high-speed protocols MMC ("multimedia card") and USB ("universal serial bus"), whose corresponding interface devices 4, 6 carry out a communication via the MMC protocol as standard via the contacts C4, C6 and C8 and a communication via the USB protocol via the contacts C4 and C8, so that the contact assignments of the two high-speed protocols USB and MMC collide with regard to the contacts C4 and C8. Furthermore, it is also possible to use other contact-type communication protocols, e.g. the SD protocol based on the MMC protocol, which is used in SD memory cards ("secure digital cards").

Besides said protocols coordinated with a contact-type communication, it is increasingly common in chip cards to also use communication protocols for a contactless communication which use further contact assignments of the contact pad according to ISO 7816-2. In this connection there must be mentioned in particular those communication protocols that are used in near field communication of the chip card with an end device via radio or radiofrequency signals. As an example of such contactless communication protocols there will hereinafter be assumed the SWP protocol which uses the contact C6. However, the inventive principle can be transferred directly to any other contactless communication protocol via which a portable data carrier, such as a chip card or smart card, can carry out a contactless communication with an end device, terminal or other communication device. It is thus also possible for example to use other contactless communication protocols, e.g. ones coordinated with a radio communication via a Bluetooth interface, via WiFi technology ("wireless fidelity") or via RFID ("radio frequency identification").

To ensure a very high availability of the chip card 1 with regard to a contactless near field communication via the SWP protocol and to permit a contactless communication according to the SWP protocol to be executed simultaneously with at least one contact-type communication according to one of the contact-type protocols, the chip card 1 comprises a control device 3 (CNTL) which checks a voltage present at individual contacts of the contact pad 2 and determines therefrom one or more communication protocols preset by end devices/terminals. In this way the control device 3 recognizes possible collisions with regard to individual contacts of the contact pad 2 that are used by different interface devices 4, 5, 6, 7, and activates the corresponding contact assignments in such a way that besides an active interface device 4, 5, 6 for contact-type communication at least also one interface device 7 for contactless communication can be active. It is thereby achieved in particular that the contact C6 which is required by the SWP interface device for near field communication is available for the SWP protocol, so that there is a uniform solution for realizing a parallel near field communication with a chip card 1. The control device 3 permits the SWP interface device 7 to be operated simultaneously with at least one of the USB, ISO, MMC interface devices 4, 5, 6 shown in FIG. 1 and for it to be preferred by the control device 3 over a second contact interface device 4, 5, 6 to be activated. Furthermore, it is also possible to activate via the control device 3 free of collision further interface devices and their protocols, such as the contact-type SD protocol or further contactless protocols.

The collision check and controlled activation by the control device 3 can be used advantageously in particular in connection with the competing contact assignments of the contact-type MMC protocol and the contactless SWP protocol. For this purpose, the control device 3 shown in FIG. 2 carries out an adaptive clock recognition at the contacts C3 and C6 during the boot-up/initialization sequence upon switchon of the chip card 1 in order to determine whether a clock signal of the MMC protocol is present at one of said contacts. The end device/terminal which is connected to the chip card 1 ensures that in this phase only one of two contacts C3 and C6 carries a clock signal and the other has a constant voltage level.

For recognizing an MMC communication protocol present at the contact pad 2, the control device 3 first checks the supply voltage present at the contact C4 and/or C8. If an elevated voltage level is ascertained at one or both contacts, the control device 3 will assume an MMC protocol. The control device 3 will likewise assume a present MMC protocol if there is a CMD1 signal incoming via the contact C8 and trans-mitted according to the specification MMC 4.1 in the initialization phase of the MMC protocol.

The control device 3 thus checks whether the clock for the MMC protocol is present at C3 or at C6. If a clock signal of the MMC protocol is present at the contact C3, the MMC interface device 6 with the contact assignment C3, C4, C8 is activated. The contact C6 then remains free for the SWP interface device 7 for communication according to the SWP protocol, because the contact C6 is not used by the MMC protocol.

When the MMC interface device 6 is activated as a first contact interface device by the control device 3, the contact at which the clock signal of the MMC protocol is present is used firmly as the clock source for the MMC interface device 6 as long as a supply voltage is present. Other contacts, in particular the contact C3 in the case of an MMC clock signal at C6, or the contact C6 in the case of an MMC clock signal at C3, can be used for other protocols from this time on. When the MMC clock signal is recognized at C3, the contact C6 can be activated for the SWP interface device 7. These possible contact assignments of the MMC protocol are shown in FIGS. 3 and 4, in which the contact assignment for the MMC protocol has the clock (CLK) at C3 (FIG. 4) or C6 (FIG. 3, dashed), carries a DATO signal at C4 and a CMD signal at C8.

A present ISO communication protocol is recognized by the control device 3 by a clock signal present at the contact C3, the delimitation over the MMC protocol consisting in a change of voltage level at the contact C2 from 0 (low) to 1 (elevated) during the initialization sequence of the ISO protocol. The control device 3 then activates the ISO interface device 5 with the contact C3 for the clock (CLK), C2 for a reset line (RST) and C7 for an input/output data line (I/O).

FIG. 3 shows the contact assignments of a simultaneously activated contact-type ISO interface device and contactless SWP interface device. The usual contact assignment of the MMC protocol with the clock signal at C6 does not collide with that of the ISO protocol, but it does with the SWP protocol, whose signal is present at the contact C6.

FIG. 5 shows that a simultaneous operation of the ISO interface device 5, the USB interface device 4 and the SWP interface device 7 is possible, because these three protocols use mutually different contact assignments. The USB protocol carries during its initialization sequence a zero voltage at C4 and C8 by which the USB protocol can be distinguished from the MMC protocol which carries an elevated voltage level at said contacts. By the zero voltage at C4 and/or C8 or by special USB initialization signals at C4 (D+) or C8 (D−) during the USB initialization sequence, a USB protocol present at the contact pad 2 is recognized by the control device 3 and the USB interface device 4 activated. Because the contact assignment of the USB interface device 4 collides with that of the MMC interface device 6 and thus an additional activation of the MMC interface device 6 is impossible, the contact C6 remains free for the SWP protocol. The USB and ISO interface devices 4, 5 can thus be activated simultaneously, because neither of said contact interface devices requires the contact C6, and thus a contactless communication of the chip card 1 with a terminal still remains possible.

An SWP protocol present at the contact pad 2 is fundamentally recognizable by a voltage modulation at the contact C6, because in contrast to the clock signals otherwise present at the contact C6 from contact-type protocols, such as the MMC protocol, the SWP signal is pulse-width modulated and thus distinguishable from a clock signal. In this way the control device 3 can also carry out an exclusive activation of the SWP interface device 7 if no contact-type communication protocol is present, e.g. if the power supply of the end device is not working and the power supply of the chip card 1 is being effected via a near field communication controller.

The invention claimed is:

1. A method for activating a preset contact assignment on a contact pad of a portable data carrier, comprising the following steps carried out in the portable data carrier:
   activating a first contact assignment in reaction to a first communication protocol present at the contact pad, the first communication protocol being assigned to a first portion of the contacts of the contact pad, and different contact assignments being activatable for the second portion of the contact pad not assigned by the first contact assignment;
   activating a second contact assignment in reaction to a second communication protocol present at the contact pad, while the first contact assignment is simultaneously activated;
   reserving at least one contact from the second portion of the contacts of the contact pad for a third contact assignment while the first contact assignment is activated; and
   checking for a collision of the second contact assignment with the reservation, the activation of the second contact assignment being effected in reaction to a second communication protocol present at the contact pad when the checking step yields no collision.

2. The method according to claim 1, wherein, in the checking step a collision is recognized when the reserved at least one contact would be assigned by the second contact assignment.

3. The method according to claim 1, wherein, in the checking step a collision is recognized when the reserved at least one contact would be assigned by the second contact assignment, contrary to a contact assignment preset by the reservation.

4. The method according to claim 1, wherein, in the checking step a collision is recognized when the reserved at least one contact would be assigned by a contact assignment preset from outside the data carrier.

5. The method according to claim 1, wherein the reservation of the at least one contact of an instance on the portable data carrier, said instance exchanging data via the first contact assignment, maintains the possibility of exchanging further data via the third contact assignment.

6. The method according to claim 1, wherein the reservation is effected according to a setting which is stored in the portable data carrier.

7. The method according to claim 6, wherein the reservation is triggered by the fulfillment of a condition contained in the setting.

8. The method according to claim 1, wherein the reserving step is carried out in response to a reserve request of an application exchanging data via the first contact assignment.

9. The method according to claim 1, wherein the reservation is suspended in response to a release request of an application exchanging data via the first contact assignment.

10. The method according to claim 1, wherein the reservation is maintained for a limited period which is smaller than a period of activation of the first contact assignment.

11. A portable data carrier arranged to execute the method according to claim 1.

12. A method for activating a preset contact assignment of a contactless communication protocol on a contact pad according to ISO 7816-2 of a portable data carrier, comprising the steps according to claim 1, the first communication protocol being a contact-type communication protocol, further wherein, in the event that the second communication protocol present at the contact pad is a second contact-type communication protocol, the contact assignment of the second contact-type communication protocol is only activated as a second contact assignment when the contact assignment of the second contact-type communication protocol does not collide with the preset contact assignment of the contactless communication protocol.

13. The method according to claim 12, wherein, in the event that the second communication protocol is the contactless communication protocol, the pre-set contact assignment thereof is only activated as a second contact assignment when the preset contact assignment does not collide with the contact assignment of the first contact-type communication protocol.

14. The method according to claim 12, including the step of recognizing a contact assignment of a communication protocol present at the contact pad by monitoring a voltage supply of certain contacts of the contact pad after the switch-on of the portable data carrier.

15. The method according to claim 14, including the further step of recognizing the contact assignment of a contactless SWP communication protocol by a voltage modulation at the C6 contact of the contact pad, before the activating step.

16. The method according to claim 14, wherein the contact assignment of a contact-type MMC communication protocol is recognized by a preset voltage level present at the C4 contact and/or the C8 contact of the contact pad and/or initialization signal of the MMC communication protocol.

17. The method according to claim 16, wherein
if the MMC communication protocol is recognized as a first or second communication protocol by a clock signal of the MMC communication protocol, said signal being present at the C3 contact of the contact pad, the C3 contact of the contact pad is activated for the clock signal of the MMC communication protocol, and
if simultaneously the contactless communication protocol is present at the contact pad as a second or further communication protocol, the C6 contact of the contact pad is activated for the contactless communication protocol.

18. The method according to claim 16, wherein if the MMC communication protocol is recognized as a first communication protocol by a clock signal of the MMC communication protocol, said signal being present at the C6 contact of the contact pad, the C6 contact of the contact pad is activated for a clock signal of the MMC communication protocol.

19. The method according to claim 16, wherein, if the MMC communication protocol is recognized as a second communication protocol by a clock signal of the MMC communication protocol, said signal being present at the C6 contact of the contact pad, the contact assignment of the MMC communication protocol is deactivated or not activated.

20. The method according to claim 12, wherein
if a contact-type ISO communication protocol is recognized as a first communication protocol by a clock signal of the ISO communication protocol, said signal being present at the C3 contact of the contact pad, the contact assignment of the contact-type ISO communication protocol is activated, and
if simultaneously the contactless communication protocol is present at the contact pad as a second communication protocol, the C6 contact of the contact pad is activated for the contactless communication protocol.

21. The method according to claim 12, wherein
if a contact-type USB communication protocol is recognized as a first or second communication protocol by a zero voltage present at the C4 contact and/or the C8 contact, and/or an initialization signal of the USB communication protocol, the contact assignment of the contact-type USB communication protocol is activated, and
if simultaneously the contactless communication protocol is present at the contact pad as a second or further communication protocol, the C6 contact of the contact pad is activated for the contactless communication protocol.

22. The method according to claim 12, wherein the method is executed on a chip card as the portable data carrier.

23. A portable data carrier, comprising a contact pad according to ISO 7816-2, at least two interface devices adapted to communicate with an end device according to a corresponding communication protocol via a corresponding contact assignment of the contact pad and a control device, the at least two interface devices comprising
at least one contact interface device communicating according to a contact-type communication protocol, and
a contactless interface device communicating according to a contactless communication protocol via a preset contact assignment of the contact pad, and
the control device is adapted to activate, simultaneously with a first contact interface device already activated in reaction to a first contact-type communication protocol present at the contact pad, a second interface device in reaction to a second communication protocol present at the contact pad;
wherein the control device is adapted to activate, in the event that the second interface device is a contact interface device, the second contact interface device only when the contact assignment of the second contact interface device does not collide with the preset contact assignment of the contactless interface device.

24. The data carrier according to claim 23, wherein the control device is adapted to activate, in the event that the second interface device is the contactless interface device, the contactless interface device only when the preset contact assignment thereof does not collide with the contact assignment of the first contact interface device.

25. The data carrier according to claim 23, wherein the control device is adapted to monitor a voltage supply of certain contacts of the contact pad by the end device and to recognize the contact assignment of a communication protocol applied to the contact pad by the end device by monitoring the voltage supply after a switch-on of the data carrier.

26. The data carrier according to claim 25, wherein
the contactless interface device is an SWF interface device for communication according to the contactless SWP communication protocol, and
the control device is adapted to recognize the preset contact assignment of the contactless SWP communication protocol by a voltage modulation at the C6 contact of the contact pad.

27. The data carrier according to claim 25, wherein
the at least one contact interface device comprises an MMC interface device for communication according to the contact-type MMC communication protocol, and
the control device is adapted to recognize a contact-type MMC communication protocol present at the contact pad by a preset voltage level and/or initialization signal according to the MMC communication protocol at the C4 contact and/or the C8 contact of the contact pad.

28. The data carrier according to claim 27, wherein the control device is adapted
to recognize a contact assignment of the MMC communication protocol by a clock signal of the MMC communication protocol, said signal being present at the C3 contact of the contact pad, and
if the MMC communication protocol is recognized as a first or second communication protocol, to activate the MMC interface device with the C3 contact of the contact pad for the clock signal of the MMC communication protocol, and
if simultaneously the contactless communication protocol is recognized as a second or further communication protocol, to activate the contactless inter-face device with the C6 contact as the preset contact assignment.

29. The data carrier according to claim 27, wherein the control device is adapted
to recognize a contact assignment of the MMC communication protocol by a clock signal of the MMC communication protocol, said signal being present at the C6 contact of the contact pad, and
if the MMC communication protocol is recognized as a first communication protocol, to activate the MMC interface device with the C6 contact of the contact pad for the clock signal of the MMC communication protocol.

30. The data carrier according to claim 27, wherein the control device is adapted
to recognize a contact assignment of the MMC communication protocol by a clock signal of the MMC communication protocol, said signal being present at the C6 contact of the contact pad, and
if the MMC communication protocol is recognized as a second contact-type communication protocol, to deactivate or not to activate the MMC interface device.

31. The data carrier according to claim 23, wherein the at least one contact interface device comprises an ISO interface device adapted to communicate according to the contact-type ISO communication protocol, and the control device is adapted
to recognize a contact assignment of the ISO communication protocol by a clock signal of the ISO communication protocol, said signal being present at the C3 contact of the contact pad, and
if the ISO communication protocol is recognized as a first communication protocol, to activate the ISO interface device with the C3 contact of the contact pad as the clock signal of the ISO communication protocol, and
if simultaneously the contactless communication protocol is recognized as a second communication protocol, to activate the contactless interface device with the C6 contact of the contact pad as the preset contact assignment.

32. The data carrier according to claim 23, wherein the at least one contact interface device comprises a USB interface device adapted to communicate according to the contact-type USB communication protocol, and the control device is adapted
to recognize a contact assignment of the USB communication protocol by a zero voltage present at the C4 contact and/or the C8 contact, and/or an initialization signal of the USB communication protocol, and
if the USB communication protocol is recognized as a first or second communication protocol, to activate the USB interface device, and
if simultaneously the contactless communication protocol is recognized as a second or further communication protocol, to activate the contactless interface device with the C6 contact of the contact pad as the preset contact assignment.

33. The data carrier according to claim 23, wherein the data carrier comprises is a chip card with a processor, and the control device comprises an application of the data carrier that is executable on the processor.

* * * * *